United States Patent
Peterson

[15] 3,656,662
[45] Apr. 18, 1972

[54] EXPULSION TANK COLLECTOR PLATE

[72] Inventor: Richard G. Peterson, Littleton, Colo.

[73] Assignee: The United States of America as represented by the Secretary of the Air Force

[22] Filed: May 27, 1970

[21] Appl. No.: 40,974

[52] U.S. Cl.....................................................222/386.5
[51] Int. Cl.........................................................B67d 5/54
[58] Field of Search..............222/386.5, 389, 95; 137/564.5; 184/39; 239/322, 323

[56] References Cited

UNITED STATES PATENTS 2,980,177  4/1961  Glasson..........................222/386.5 X
2,924,359  2/1960  Beremand..........................222/386.5

Primary Examiner—Robert B. Reeves
Assistant Examiner—Francis J. Bartuska
Attorney—Harry A. Herbert, Jr. and Richard J. Killoren

[57] ABSTRACT

In a positive expulsion tank having a ribbed diaphragm provided within the tank wherein a fluent material admitted to the chamber on one side of the diaphragm forces liquid, in the chamber on the other side of the diaphragm, through the outlet port. A circular collector plate is secured to the tank outlet plate and is spaced from the wall of the tank to provide an annular collection channel which encompasses the center of the diaphragm rib pattern when the diaphragm is at its maximum off-center position.

1 Claims, 5 Drawing Figures

INVENTOR.
RICHARD G. PETERSON
BY Harry A. Herbert Jr.
ATTORNEY
Richard J. Killoren
AGENT INVENTOR.
RICHARD G. PETERSON
BY Harry A. Herbert Jr
ATTORNEY
Richard J. Killoe
AGENT

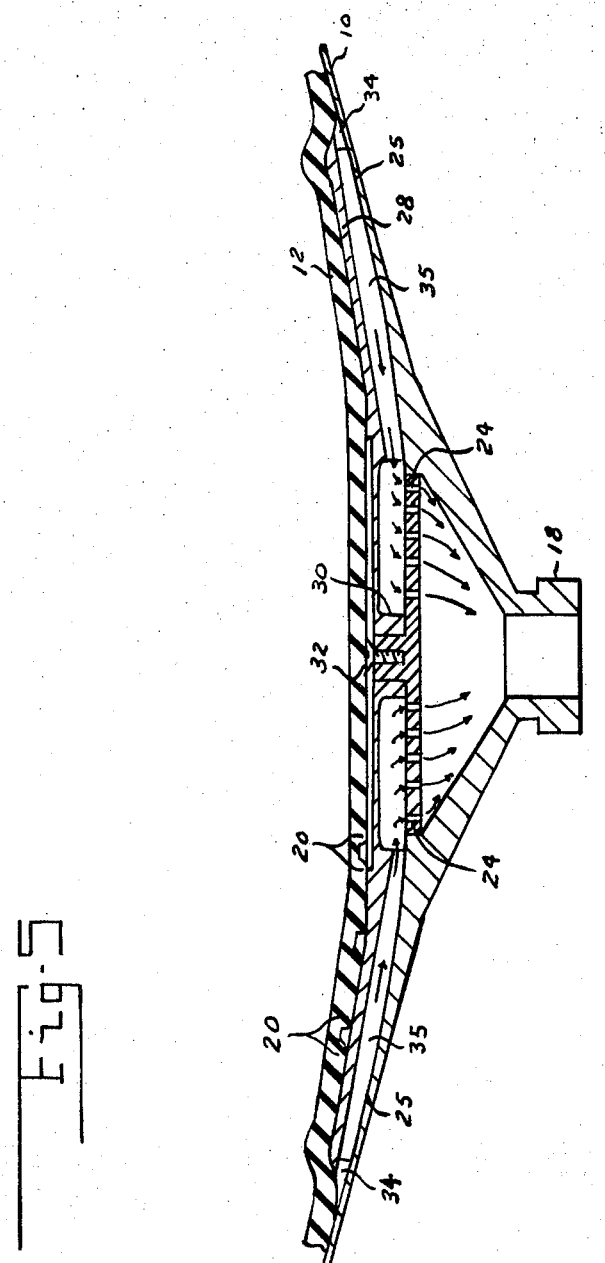

EXPULSION TANK COLLECTOR PLATE

BACKGROUND OF THE INVENTION

In some positive expulsion tanks a diaphragm is provided within the tank. A gas or liquid is supplied to the tank on one side of the diaphragm to force liquid, on the other side of the diaphragm, out of the tank. Radially oriented ribs have been molded around the apex of the diaphragm on the side adjacent the outlet port so that the diaphragm will not form a seal at the outlet port to shut off or substantially reduce the flow from the tank. Even with ribs thus provided, shut-off of flow is sometimes caused by material between the ribs, when the apex of the diaphragm is not centered on the outlet port.

BRIEF SUMMARY OF THE INVENTION

According to this invention a collector plate, having an annular collection channel and a plurality of radial channels, is positioned over the tank outlet. The collector plate has a radius great enough to encompass the center of the rib pattern when the apex of the diaphragm is at its maximum off-center position.

IN THE DRAWING

FIG. 5 is a sectional view of the device of FIG. 4 along the line 5—5.

BRIEF DESCRIPTION OF THE INVENTION

Figure 1:
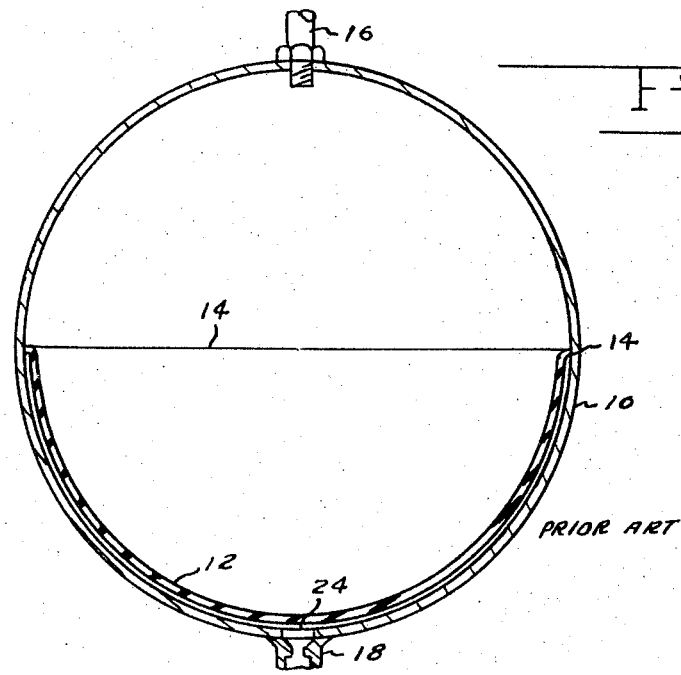
FIG. 1 is a partially schematic sectional view of a positive expulsion tank with a flexible diaphragm.
Figure 2:
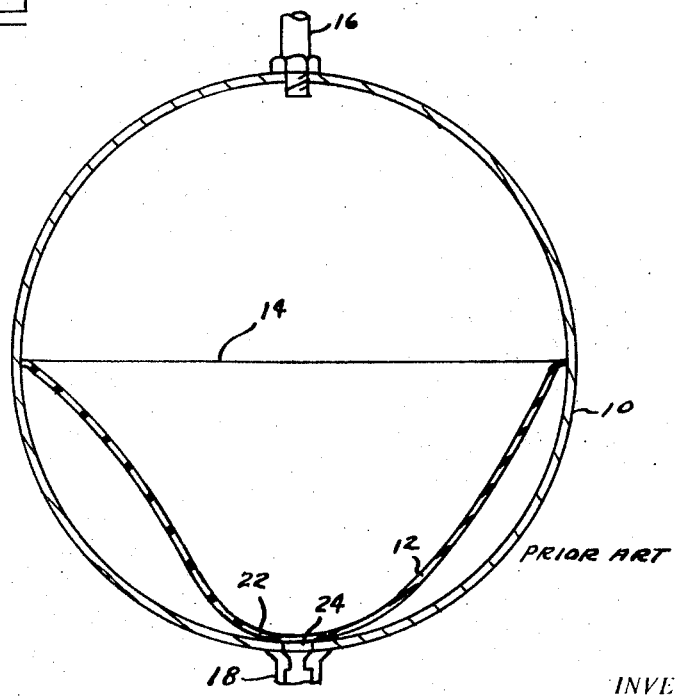
FIG. 2 is a partially schematic view of the device of FIG. 1 with the apex of the diaphragm in an off-center position.
Figure 3:
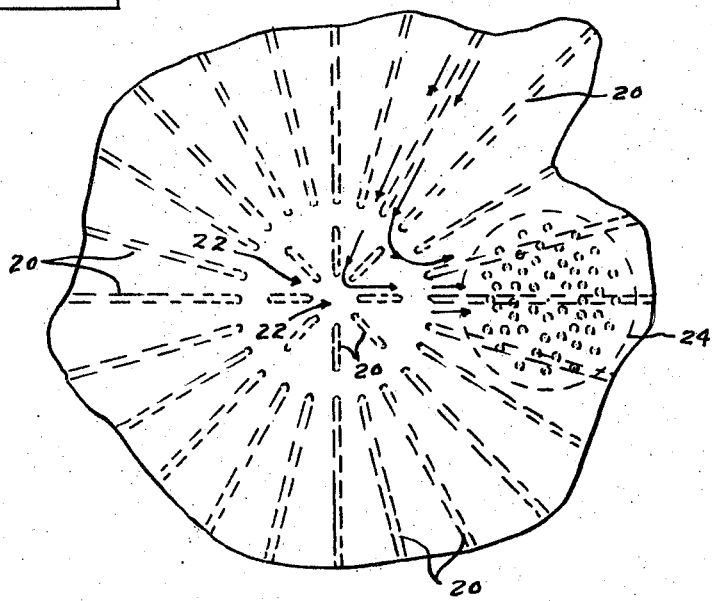
FIG. 3 is a partially cutaway plan view of the device of FIG. 2 showing the off-center position of the apex of the diaphragm.

Referring now to FIG. 1 of the drawing, which shows a prior art positive expulsion tank 10 having a diaphragm 12 secured to the tank 10 at 14, a gas or liquid is normally supplied to an inlet shown at 16 to force a liquid out through outlet 18. Molded ribs shown at 20 in FIG. 3, are normally provided to prevent sealing-off the outlet 18. When the apex 22 is displaced from the center of tank outlet plate 24, covering outlet 18, as shown in FIGS. 2 and 3, the diaphragm material between the ribs 20 can substantially seal off the outlet.

Figure 4:
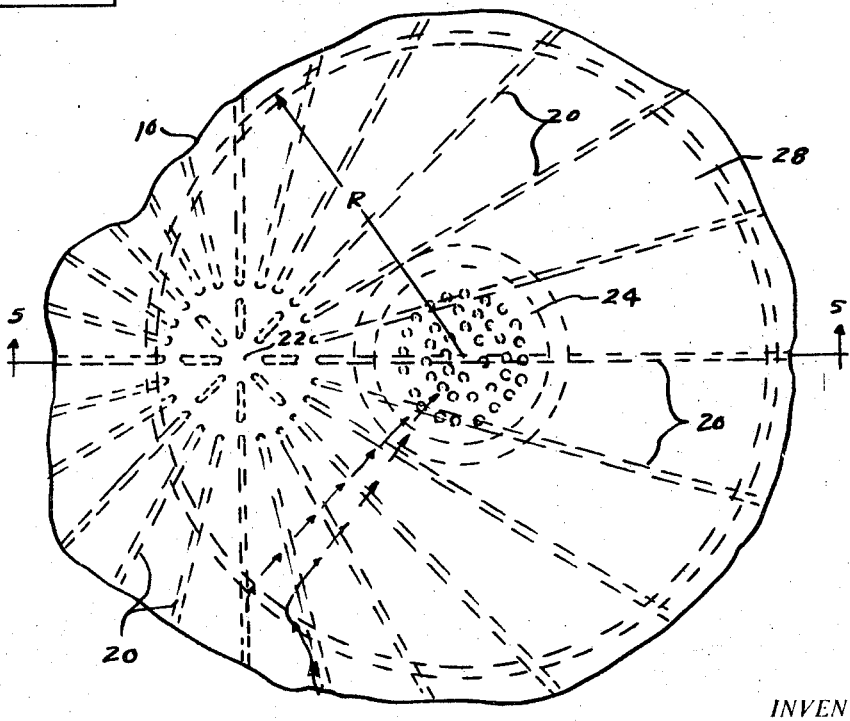
FIG. 4 is a partially cutaway plan view showing an off-center apex of a diaphragm with a collector plate of the invention.

To prevent this a collector plate 28, shown in FIGS. 4 and 5, is positioned over the outlet plate 24. A boss 30 on the collector plate 28 surrounds a projection 32 on the outlet plate 24 and acts together with ribs 25 to space the collector plate from the chamber wall to provide annular peripheral liquid collection channel 34 and radial channels 35. The radius of collector plate 28 is great enough to cover the apex of the diaphragm 12 at its maximum possible displacement.

In the operation of the device, the liquid follows ribs 20 on the diaphragm 12 until it reaches the annular collection channel 34. The liquid then passes along a radial path between ribs 25 into the outlet port 18.

There is thus provided a device to keep the outlet of a positive expulsion tank from being sealed off when the apex of the diaphragm is off-center from the outlet port.

I claim:

1. In combination with a positive expulsion type tank having a flexible diaphragm dividing the tank into upper and lower noncommunicating chambers with an outlet port centrally located in the lower chamber, wherein the diaphragm has radial ribs positioned in a predetermined area around the apex and wherein the diaphragm apex can move to various positions with respect to said outlet port including means for supplying a fluent material to the upper chamber to force the liquid out of the lower chamber through said outlet port; a device to prevent the sealing off of the outlet port by the diaphragm material between said ribs, comprising: means for keeping said diaphragm from coming into contact with said outlet port including means for forming a circular channel, around the outlet port, of a greater radius than the maximum lateral displacement of the apex of said diaphragm from the center of the outlet port; said means for keeping said diaphragm from coming into contact with said outlet port including a circular collector plate covering said outlet port and spacer means, between said outlet port and said circular collector plate, for spacing the collector plate from the wall of said tank to thereby form said annular channel around the outlet port.

* * * * *